(12) United States Patent
Dry

(10) Patent No.: US 6,402,808 B1
(45) Date of Patent: Jun. 11, 2002

(54) DIRECT SMELTING PROCESS

(75) Inventor: Rodney James Dry, City Beach (AU)

(73) Assignee: Technological Resources Pty. Ltd., Melbourne (AU)

(*) Notice: Subject to any disclaimer, the term of this patent is extended or adjusted under 35 U.S.C. 154(b) by 0 days.

(21) Appl. No.: 09/509,264

(22) PCT Filed: Jul. 26, 1999

(86) PCT No.: PCT/AU99/00599
§ 371 (c)(1),
(2), (4) Date: Mar. 21, 2000

(87) PCT Pub. No.: WO00/06782
PCT Pub. Date: Feb. 10, 2000

(30) Foreign Application Priority Data

Jul. 24, 1998 (AU) .............................................. PP4838

(51) Int. Cl.[7] .............................................. C21B 15/00
(52) U.S. Cl. .............................. 75/500; 75/501; 75/502
(58) Field of Search ......................... 75/500, 501, 502; 266/160

(56) References Cited

U.S. PATENT DOCUMENTS

| | | |
|---|---|---|
| 2,647,045 A | 7/1953 | Rummel |
| 3,844,770 A | 10/1974 | Nixon |
| 3,845,190 A | 10/1974 | Yosim et al. |
| 3,888,194 A | 6/1975 | Kishigami et al. |
| 3,890,908 A | 6/1975 | von Klenck et al. |

(List continued on next page.)

FOREIGN PATENT DOCUMENTS

| | | |
|---|---|---|
| AU | A-23864/84 | 1/1984 |
| AU | B-41064/85 | 4/1986 |
| AU | B-69707/87 | 9/1987 |
| AU | B-22448/88 | 5/1989 |
| AU | B-26831/88 | 7/1989 |

(List continued on next page.)

OTHER PUBLICATIONS

Patent Abstract of Japan, JP, A, 10–280020 (Nippon Steel Corp.), Oct. 20, 1998.
Patent Abstract of Japan, C–951, p. 24, JP, A, 04–63218 (Kawasaki Heavy Ind. Ltd), Feb. 28, 1992.
Patent Abstract of Japan, C–267, p. 109, Jp, A, 01–127613 (Kawasaki Steel Corp.), May 19, 1989.
Patent Abstract of Japan, C–951, JP, A, 4–63217 (Kawasaki Heavy Ind. Ltd), Feb. 28, 1992.
Patent abstract of Japan, C–497, p. 115, JP, A, 62–280315 (Nippon Kokan K.K), Dec. 15, 1987.

*Primary Examiner*—Melvyn Andrews
(74) *Attorney, Agent, or Firm*—Merchant & Gould, P.C.

(57) ABSTRACT

A process for direct smelting a metalliferous feed material is disclosed. Char and fuel gas are produced by pre-treating coal with an oxygen-containing gas. The fuel gas is used to heat an oxygen-containing gas and/or to produce an oxygen-containing gas in an oxygen plant. Metalliferous feed material, char, and the oxygen-containing gas are injected into a direct smelting vessel, and the metalliferous feed material is smelted to molten metal in the direct smelting vessel using the char as a source of energy and as a reductant.

6 Claims, 2 Drawing Sheets

U.S. PATENT DOCUMENTS

Figure 1:
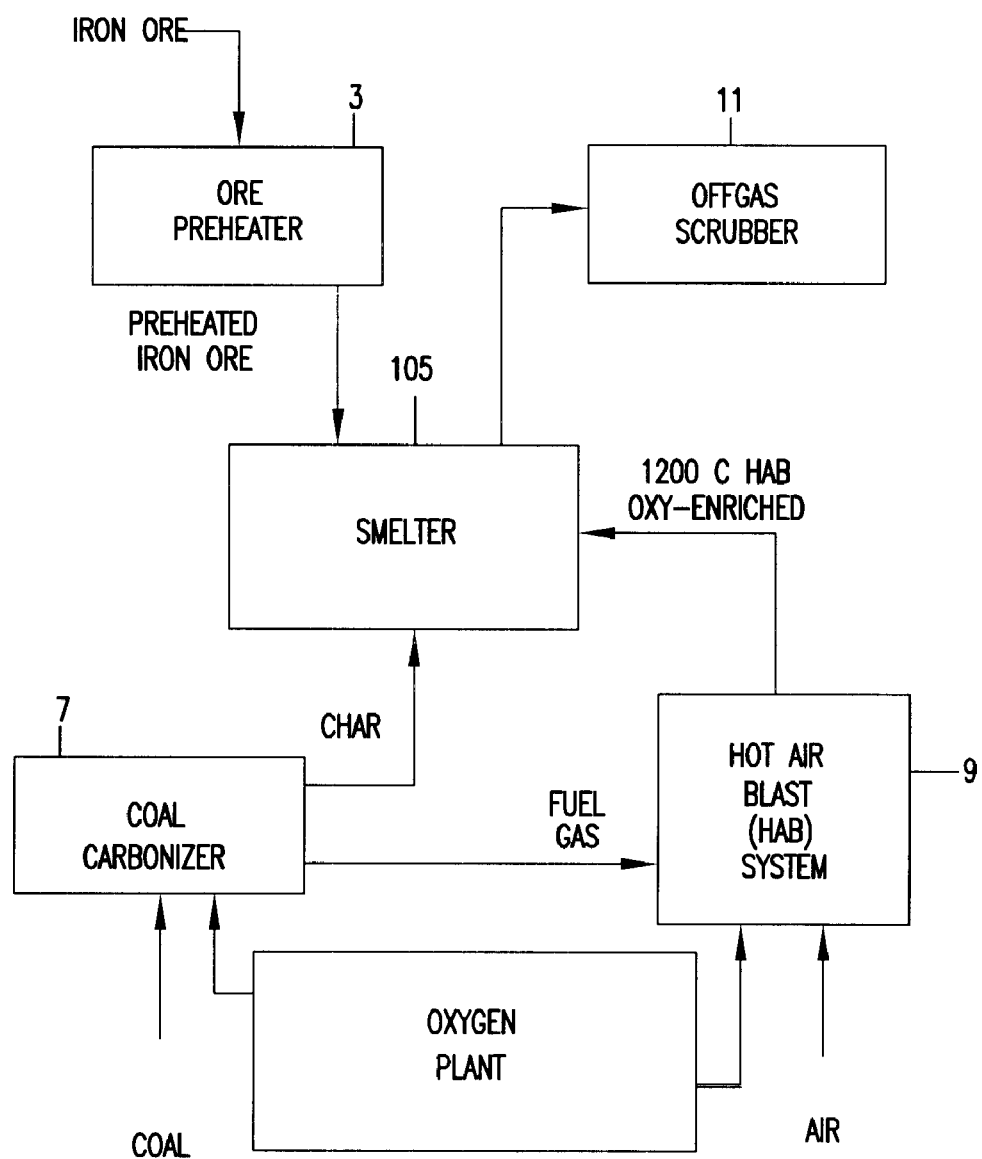

| | | |
|---|---|---|
| 3,894,497 A | 7/1975 | Helke et al. |
| 4,007,034 A | 2/1977 | Hartwig et al. |
| 4,053,301 A | 10/1977 | Stephens, Jr. |
| 4,145,396 A | 3/1979 | Grantham |
| 4,177,063 A | 12/1979 | Dickson |
| 4,207,060 A | 6/1980 | Zangs |
| 4,356,035 A | 10/1982 | Brotzmann et al. |
| 4,389,043 A | 6/1983 | Weber et al. |
| 4,400,936 A | 8/1983 | Evans |
| 4,402,274 A | 9/1983 | Meenan et al. |
| 4,431,612 A | 2/1984 | Bell et al. |
| 4,447,262 A | 5/1984 | Gay et al. |
| 4,455,017 A | 6/1984 | Wunsche |
| 4,468,298 A | 8/1984 | Byrne et al. |
| 4,468,299 A | 8/1984 | Byrne et al. |
| 4,468,300 A | 8/1984 | Byrne et al. |
| 4,481,891 A | 11/1984 | Takesita et al. |
| 4,504,043 A | 3/1985 | Yamaoka et al. |
| 4,511,396 A | 4/1985 | Nixon |
| 4,565,574 A | 1/1986 | Natayama et al. |
| 4,566,904 A | 1/1986 | von Bogdandy et al. |
| 4,574,714 A | 3/1986 | Bach et al. |
| 4,602,574 A | 7/1986 | Bach et al. |
| 4,664,618 A | 5/1987 | Gitman |
| 4,681,599 A | 7/1987 | Obkircher |
| 4,684,448 A | 8/1987 | Itoh et al. |
| 4,701,214 A | 10/1987 | Kaneko et al. |
| 4,718,643 A | 1/1988 | Gitman |
| 4,786,321 A | 11/1988 | Hoster et al. |
| 4,790,516 A | 12/1988 | Sugiura et al. |
| 4,798,624 A | 1/1989 | Brotzmann et al. |
| 4,849,015 A | 7/1989 | Fassbinder et al. |
| 4,861,368 A | 8/1989 | Brotzmann et al. |
| 4,874,427 A | 10/1989 | Hamada et al. |
| 4,890,562 A | 1/1990 | Gitman |
| 4,913,734 A | 4/1990 | Romenets et al. |
| 4,923,391 A | 5/1990 | Gitman |
| 4,940,488 A | 7/1990 | Maeda et al. |
| 4,946,498 A | 8/1990 | Weber |
| RE33,464 E | 11/1990 | Gitman |
| 4,976,776 A | 12/1990 | Elvander et al. |
| 4,999,097 A | 3/1991 | Sadoway |
| 5,005,493 A | 4/1991 | Gitman |
| 5,024,737 A | 6/1991 | Claus et al. |
| 5,037,608 A | 8/1991 | Tarcy et al. |
| 5,042,964 A | 8/1991 | Gitman |
| 5,050,848 A | 9/1991 | Hardie et al. |
| 5,051,127 A | 9/1991 | Hardie et al. |
| 5,065,985 A | 11/1991 | Takahashi et al. |
| 5,177,304 A | 1/1993 | Nagel |
| 5,191,154 A | 3/1993 | Nagel |
| 5,222,448 A | 6/1993 | Morgenthaler et al. |
| 5,238,646 A | 8/1993 | Tarcy et al. |
| 5,271,341 A | 12/1993 | Wagner |
| 5,279,715 A | 1/1994 | La Camera et al. |
| 5,301,620 A | 4/1994 | Nagel et al. |
| 5,302,184 A | 4/1994 | Batterham et al. |
| 5,322,547 A | 6/1994 | Nagel et al. |
| 5,332,199 A | 7/1994 | Knapp et al. |
| 5,333,558 A | 8/1994 | Lees, Jr. |
| 5,396,850 A | 3/1995 | Conochie et al. |
| 5,401,295 A | 3/1995 | Brotzmann |
| 5,407,461 A | 4/1995 | Hardie et al. |
| 5,415,742 A | 5/1995 | La Camera et al. |
| 5,443,572 A | 8/1995 | Wilkison et al. |
| 5,480,473 A | 1/1996 | Hardie et al. |
| 5,489,325 A | 2/1996 | Keogh et al. |
| 5,498,277 A | 3/1996 | Floyd et al. |
| 5,518,523 A | 5/1996 | Brotzmann |
| 5,529,599 A | 6/1996 | Calderon |
| 5,613,997 A | 3/1997 | Satchell, Jr. |
| 5,640,708 A | 6/1997 | Conochie et al. |
| 5,647,888 A | 7/1997 | Keogh et al. |
| 5,733,358 A * | 3/1998 | Geiger et al. ............... 75/501 |
| 5,741,349 A | 4/1998 | Hubble et al. |
| 5,800,592 A | 9/1998 | den Hartog et al. |
| 5,802,097 A | 9/1998 | Gensini et al. |
| 5,938,815 A | 8/1999 | Satchell, Jr. ............... 75/500 |
| B1 4,940,488 A | 8/1999 | Maeda et al. |
| 6,053,961 A * | 4/2000 | Satchell, Jr. ............... 75/448 |
| 6,126,717 A * | 10/2000 | Gauthier et al. ............ 75/466 |
| 6,171,364 B1 * | 1/2001 | Sarma et al. ............... 75/501 |

FOREIGN PATENT DOCUMENTS

| | | |
|---|---|---|
| AU | B-28802/89 | 8/1989 |
| AU | A-42859/89 | 4/1990 |
| AU | A-49307/90 | 9/1990 |
| AU | A-49309.90 | 9/1990 |
| AU | B-74840/91 | 10/1991 |
| AU | B-90957/91 | 8/1992 |
| AU | A-48938/93 | 4/1994 |
| AU | B-48937/93 | 5/1994 |
| AU | B-50820/96 | 1/1997 |
| DE | 3139375 | 4/1983 |
| DE | 3244744 | 5/1984 |
| EP | 079 182 A1 | 5/1983 |
| EP | 084 288 A1 | 7/1983 |
| EP | 422 309 A1 | 4/1991 |
| EP | 541 269 A1 | 5/1993 |
| EP | 592 830 A1 | 4/1994 |
| EP | 657 550 | 6/1995 |
| GB | 2 043 696 A | 10/1980 |
| GB | 2 088 892 A | 6/1982 |
| WO | WO 89/01981 | 3/1989 |
| WO | WO 92/12265 | 7/1992 |
| WO | WO 93/06251 | 4/1993 |
| WO | WO 94/19497 | 9/1994 |
| WO | WO 96/19591 | 6/1996 |
| WO | WO 97/17473 | 5/1997 |
| WO | WO 98/27239 | 6/1997 |
| WO | WO 97/23656 | 7/1997 |
| WO | WO 99/16911 | 4/1999 |

* cited by examiner

DIRECT SMELTING PROCESS

The present invention relates to a process and to an apparatus for producing molten metal (which term includes metal alloys), in particular although by no means exclusively iron, from a metalliferous feed material, such as ores, partly reduced ores and metal-containing waste streams, in a metallurgical vessel containing a molten bath.

The present invention relates particularly to a molten metal bath-based direct smelting process for producing molten metal from a metalliferous feed material.

A process that produces molten metal directly from a metalliferous feed material is generally referred to as a "direct smelting process".

One known direct smelting process, which is generally referred to as the Romelt process, is based on the use of a large volume, highly agitated slag bath as the medium for smelting top-charged metal oxides to metal and for post-combusting gaseous reaction products and transferring the heat as required to continue smelting metal oxides. The Romelt process includes injection of oxygen-enriched air or oxygen into the slag via a lower row of tuyeres to provide slag agitation and injection of oxygen into the slag via an upper row of tuyeres to promote post-combustion. In the Romelt process the metal layer is not an important reaction medium.

Another known group of direct smelting processes that is slag-based is generally described as "deep slag" processes. These processes, such as DIOS and AISI processes, are based on forming a deep layer of slag with 3 regions, namely: an upper region for post-combusting reaction gases with injected oxygen; a lower region for smelting metal oxides to metal; and an intermediate region which separates the upper and lower regions. As with the Romelt process, the metal layer below the slag layer is not an important reaction medium.

Another known direct smelting process, which relies on a molten metal layer as a reaction medium and is generally referred to as the HIsmelt process, is described in International application PCT/AU96/00197 (WO 96/31627 published on Oct. 10, 1996, and corresponding to U.S. Pat. No. 6,083,296) in the name of the applicant.

The HIsmelt process as described in the International application comprises:
(a) forming a molten bath having a metal layer and a slag layer on the metal layer in a vessel;
(b) injecting into the bath:
  (i) a metalliferous feed material, typically metal oxides; and
  (ii) a solid carbonaceous material, typically coal, which acts as a reductant of the metal oxides and a source of energy; and
(c) smelting the metalliferous feed material to metal in the metal layer.

The HIsmelt process also comprises post-combusting reaction gases, such as CO and $H_2$, released from the bath in the space above the bath with oxygen-containing gas and transferring the heat generated by the post-combustion to the bath to contribute to the thermal energy required to smelt the metalliferous feed material.

The HIsmelt process also comprises forming a transition zone above the nominal quiescent surface of the bath in which there are ascending and thereafter descending droplets or splashes or streams of molten metal and/or slag which provide an effective medium to transfer to the bath the thermal energy generated by post-combusting reaction gases above the bath.

An object of the present invention is to provide a direct smelting process and apparatus that can be used with a wide range of coal types, including low grade coals.

According to the present invention there is provided a process for direct smelting a metalliferous feed material which includes the steps of:
(a) pre-treating coal with an oxygen-containing gas and producing char and a fuel gas;
(b) heating an oxygen-containing gas and/or producing an oxygen-containing gas in an oxygen plant using at least part of the fuel gas produced in step (a) as a source of energy;
(c) injecting the metalliferous feed material, char produced in step (a), and the oxygen-containing gas heated or produced in step (b) into a direct smelting vessel; and
(d) direct smelting the metalliferous feed material to molten metal in the direct smelting vessel using the char as a source of energy and as a reductant and post-combusting reaction gas produced in the smelting process with the oxygen-containing gas.

An advantage of the process of the present invention is that pre-treatment step (a) changes the properties/composition of coal and makes it more suitable for direct smelting metalliferous feed material. As a consequence, the process can operate with low grade coal at high productivity in terms of molten metal produced in the direct smelting vessel. The term "low grade coal" means coal which has low heating values and high levels of impurities relative to normal steaming coals and can be upgraded. The term "impurities" means impurities such as sulphur, alkali, salts, and volatiles. These impurities partition between the char and the fuel gas in pre-treatment step (a). As a consequence, pre-treatment step (a) results in reduced loadings of the impurities supplied to the direct smelting vessel. The reduced impurity loadings are an advantage because they mean that the rate of smelting metalliferous feed material can be increased and the volumes of off-gas discharged from the vessel can be decreased. Both outcomes are an advantage.

Moreover, the process of the present invention includes the advantageous option of using fuel gas that is produced in step (a) to heat an oxygen-containing gas, preferably air or oxygen-enriched air, which in turn is used in the direct smelting vessel. In direct smelting processes which can operate with heated air or oxygen-enriched air to post-combust reaction gases, such as the HIsmelt process, the task of generating the heated air and oxygen-enriched air is a significant issue. The fuel gas produced in step (a) is well-suited as a source of energy for heating air, for example in hot blast stoves, and therefore is a significant advantage of the process of the present invention on this basis.

The term "metalliferous feed material" is understood herein to mean any metal feed material which includes metal oxides, such as ores, partly reduced ores, and metal-containing waste streams.

The term "char" is understood herein to mean a solid product remaining after at least 50% of the moisture/bound oxygen/volatiles have been removed from coal.

Preferably, step (b) includes supplying the fuel gas to a hot air blast means and using the fuel gas as a source of energy for heating air in the hot air blast means.

Preferably the hot air blast means are hot blast stoves.

Preferably the process includes preheating the metalliferous feed material using a part of the fuel gas produced in step (a) prior to injecting the feed material into the direct smelting vessel.

Depending on the composition, the fuel gas may also be used to partially reduce the metalliferous feed material prior to injecting the feed material into the direct smelting vessel.

Step (d) may include any suitable direct smelting process.

Preferably step (d) includes direct smelting the metalliferous feed material in accordance with the HIsmelt process which includes:

(a) forming a molten bath having a metal layer and a slag layer on the metal layer in the direct smelting vessel;

(b) injecting the metalliferous feed material and the char into the metal layer via a plurality of lances/tuyeres;

(c) smelting the metalliferous feed material to molten metal substantially in the metal layer;

(d) causing molten metal and slag to be projected as splashes, droplets, and streams into a space above a nominal quiescent surface of the molten bath and forming a transition zone; and (e) injecting the oxygen-containing gas into the direct smelting vessel via one or more than one lance/tuyere and post-combusting reaction gases released from the molten bath, whereby the ascending and thereafter descending splashes, droplets, and streams of molten metal and slag in the transition zone facilitate heat transfer to the molten bath, and whereby the transition zone minimises heat loss from the vessel via the side wall in contact with the transition zone.

The term "quiescent surface" in the context of the molten bath is understood herein to mean the surface of the molten bath under process conditions in which there is no gas/solids injection and therefore no bath agitation.

Preferably the process operates high post-combustion levels in the direct smelting vessel.

Preferably the post-combustion levels are greater than 60%, where post-combustion is defined as:

$$\frac{[CO_2] + [H_2O]}{[CO_2] + [H_2O] + [CO] + [H_2]}$$

where:

$[CO_2]$=volume % of $CO_2$ in off-gas;

$[H_2O]$=volume % of $H_2O$ in off-gas;

$[CO]$=volume % of CO in off-gas; and $[H_2]$=volume % of $H_2$ in off-gas.

According to the present invention there is also provided an apparatus for direct smelting a metalliferous feed material which includes:

(a) a direct smelting vessel for smelting the metalliferous feed material;

(b) a means for producing char and a fuel gas from coal and an oxygen-containing gas;

(c) a means for generating a heated oxygen-containing gas using the fuel gas as a source of energy and thereafter supplying the heated oxygen-containing gas to the direct smelting vessel;

(d) and a means for supplying the metalliferous feed material and char to the direct smelting vessel.

Figure 2:
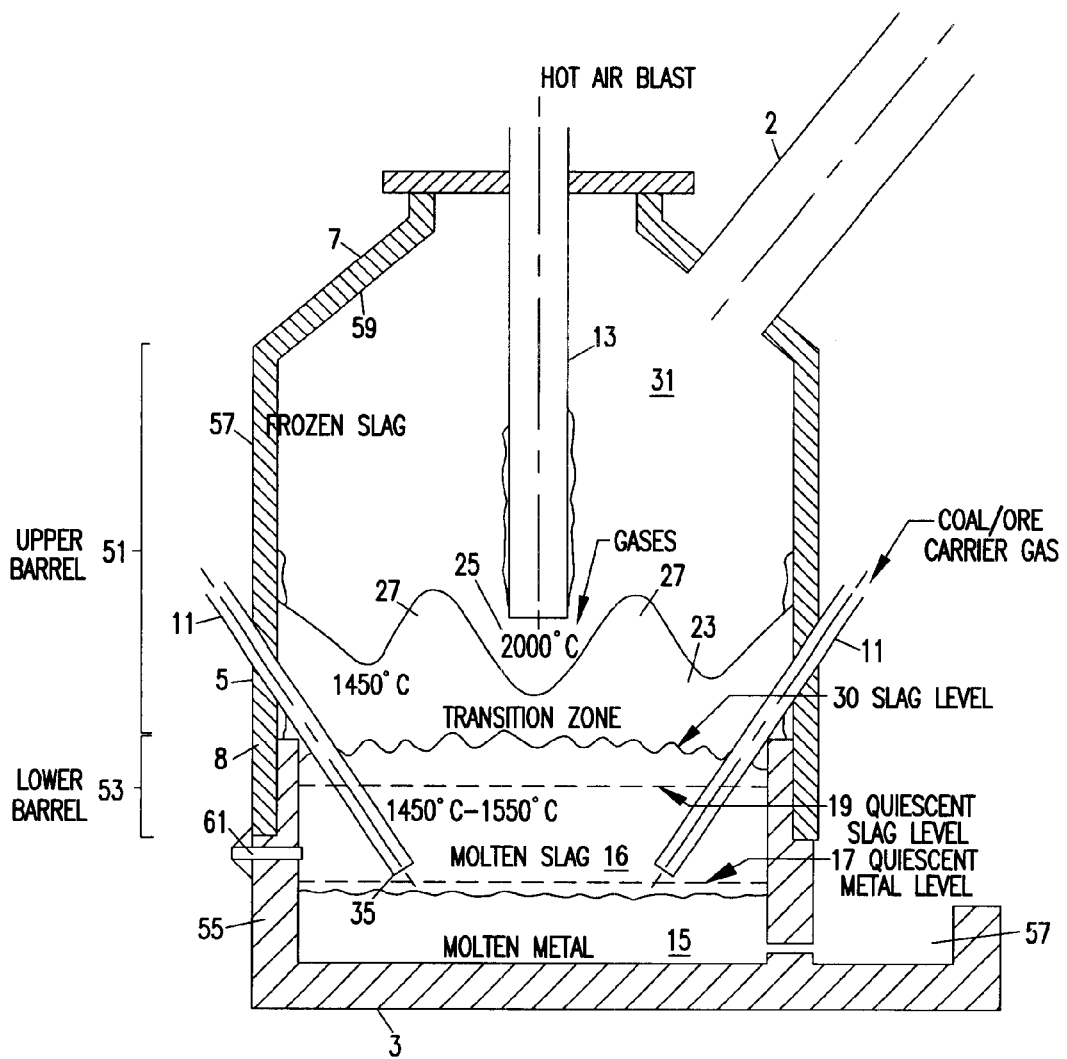

The present invention is described further by way of example with reference to the accompanying drawings, of which:

FIG. 1 is a flow sheet, in largely schematic form, of one preferred embodiment of the process and the apparatus of the present invention; and FIG. 2 is a vertical section through a preferred form of a direct smelting vessel for use in the process/apparatus illustrated in FIG. 1.

The description of the preferred embodiment shown in FIG. 1 is in the context of producing iron from iron ore. However, it is noted that the preferred embodiment is equally applicable to producing metals (including metal alloys) from other metalliferous feed material.

With reference to FIG. 1, iron ore is heated in an iron ore preheater 3 and supplied to a direct smelting vessel 105 and smelted to molten iron in that vessel.

Coal, in the form of a slurry, and oxygen are supplied to a coal carbonizer 7 and react and generate temperatures in the range of 800–1000° C. The reactions between the coal (including constituents such as volatiles in the coal) and the oxygen produce char and a fuel gas.

The term "carbonising unit" is understood herein to mean any suitable apparatus in which coal and an oxygen-containing gas can be brought into contact to generate char and a fuel gas.

The char is discharged from the carbonizer 7, cooled, stockpiled, and thereafter supplied to the direct smelting vessel 105 as a source of energy and as a reductant.

At least part of the fuel gas, which is discharged from the coal carbonizer 7 at a temperature of the order of 1000° C., is supplied via a wet scrubber (not shown) to a hot air blast system 9, such as hot blast stoves, and is combusted to generate heat which heats air to a temperature of the order of 1200° C.

The heated air is enriched with oxygen and is supplied to the direct smelting vessel 105. As is described in more detail in relation to FIG. 2, the heated oxygen-enriched air post-combusts reaction products, such as carbon monoxide and hydrogen, produced in direct smelting iron ore and the heat generated by post combustion contributes to maintaining the temperature of the interior of the direct smelting vessel 105. Typically, the process is operated at post-combustion levels in excess of 60%.

Part of the fuel gas produced in the coal carbonizer 7 is also used to preheat iron ore in the ore preheater 3 to a temperature of the order of 800° C.

Off-gas produced in the direct smelting vessel 105 is discharged at a temperature of the order of 1650° C., cooled to 1000° C., then after-burned by addition of cold air, further cooled, and then treated, for example in an off-gas scrubber 11, and thereafter released to atmosphere.

Optionally, part of the off-gas is used to preheat iron ore in the ore preheater 3.

The above described process and apparatus have a number of advantages over known technology.

By way of example, known two-stage direct smelting processes which include a pre-reduction stage and a smelting stage focus on minimising total energy consumption by using off-gases from the smelting stage as a reductant in the pre-reduction stage or as an energy feed to heat oxygen-containing gas. The present invention is an alternative to these known processes and focuses on maximising productivity. For example, treating coal in a separate carbonizer 7 and then injecting the char produced in the carbonizer into the direct smelting vessel 105 reduces the loadings of impurities in the coal that are taken into the direct smelting vessel 105. This reduces the smelting issues relating to the impurities and makes it possible to increase the productivity of the direct smelting vessel and to decrease the volume of off-gas produced in the vessel. It also makes it possible to use lower grade coals in direct smelting of iron ore. Furthermore, the fuel gas produced in the carbonizer 7 is a convenient source of combustion gas for heating the hot blast stoves. In processes, such as the HIsmelt process, which use air or oxygen-enriched air rather than oxygen for post-combusting reaction gases, producing large volumes of heated air or heated oxygen-enriched air is an important issue. Furthermore, the process of the present invention is not tied to extracting value from off-gases generated in the smelt reduction vessel 105 and this makes it possible to operate at post-combustion levels greater than 70%.

The direct smelting process operating in the direct smelting vessel 105 may be any suitable process.

The preferred direct smelting process operated in the direct smelting vessel is the HIsmelt process as described in general terms hereinafter with reference to FIG. 2 and in more detail in commonly assigned U.S. patent application Ser. No. 09/462,282 now abandoned, the disclosure of which is incorporated by reference.

The preferred direct smelting process is based on:
(a) forming a molten bath having a metal layer and a slag layer on the metal layer in the direct smelting vessel 105;
(b) injecting the pre-heated iron ore and the char into the metal layer via a plurality of lances/tuyeres;
(c) smelting the iron ore to molten iron substantially in the metal layer;
(d) causing molten iron and slag to be projected as splashes, droplets, and streams into a space above a normal quiescent surface of the molten bath and forming a transition zone; and
(e) injecting the heated oxygen-enriched air into the direct smelting vessel 105 via one or more than one lance/tuyere and post-combusting reaction gases released from the molten bath and generating gas phase temperatures of the order of 2000° C. or higher in the transition zone, whereby the ascending and thereafter descending splashes, droplets and streams of molten metal and slag in the transition zone facilitate heat transfer to the molten bath, and whereby the transition zone minimises heat loss from the vessel via the side walls in contact with the transition zone.

The direct smelting vessel 105 may be any suitable vessel.

The preferred direct smelting vessel is the vessel described in general terms hereinafter with reference to FIG. 2 and in more detail in commonly assigned U.S. patent application Ser. No. 09/535,665 now U.S. Pat. No. 6,322,745, the disclosure of which is incorporated by reference.

The vessel 105 shown in FIG. 2 has a hearth that includes a base 3 and sides 55 formed from refractory bricks; side walls 5 which form a generally cylindrical barrel extending upwardly from the sides 55 of the hearth and which include an upper barrel section 51 and a lower barrel section 53; a roof 7; an outlet 9 for off-gases; a forehearth 57 for discharging molten metal continuously; a forehearth connection 71 that interconnects the hearth and the forehearth 57; and a tap-hole 61 for discharging molten slag.

In use, under steady-state process conditions, the vessel 105 contains a molten bath of iron and slag which includes a layer 15 of molten metal and a layer 16 of molten slag on the metal layer 15. The arrow marked by the numeral 17 indicates the position of the nominal quiescent surface of the metal layer 15 and the arrow marked by the numeral 19 indicates the position of nominal quiescent surface of the slag layer 16. The term "quiescent surface" is understood to mean the surface when there is no injection of gas and solids into the vessel.

The vessel 105 also includes 2 solids injection lances/tuyeres 11 extending downwardly and inwardly at an angle of 30–60° to the vertical through the side walls 5 and into the slag layer 16. The position of the lances/tuyeres 11 is selected so that the lower ends are above the quiescent surface 17 of the metal layer 15 under steady-state process conditions.

In use, under steady-state process conditions the pre-heated iron ore, the char, and fluxes (typically lime and magnesia) entrained in a carrier gas (typically $N_2$) are injected into the metal layer 15 via the lances/tuyeres 11. The momentum of the solid material/carrier gas causes the solid material and gas to penetrate the metal layer 15. Carbon partially dissolves into the metal and partially remains as solid carbon. The iron ore is smelted to metal and the smelting reaction generates carbon monoxide gas. The gases transported into the metal layer 15 and generated via smelting produce significant buoyancy uplift of molten metal, solid carbon, and slag (drawn into the metal layer 15 as a consequence of solid/gas/injection) from the metal layer 15 which generates an upward movement of splashes, droplets and streams of molten metal and slag, and these splashes, and droplets, and streams entrain slag as they move through the slag layer 16.

The buoyancy uplift of molten metal, solid carbon and slag causes substantial agitation in the metal layer 15 and the slag layer 16, with the result that the slag layer 16 expands in volume and has a surface indicated by the arrow 30. The extent of agitation is such that there is reasonably uniform temperature in the metal and the slag regions—typically, 1450–1550° C. with a temperature variation of no more than 30° in each region.

In addition, the upward movement of splashes, droplets and streams of molten metal and slag caused by the buoyancy uplift of molten metal, solid carbon, and slag extends into the top space 31 above the molten material in the vessel and:
(a) forms a transition zone 23; and
(b) projects some molten material (predominantly slag) beyond the transition zone and onto the part of the upper barrel section 51 of the side walls 5 that is above the transition zone 23 and onto the roof 7.

In general terms, the slag layer 16 is a liquid continuous volume, with gas bubbles therein, and the transition zone 23 is a gas continuous volume with splashes, droplets, and streams of molten metal and slag.

The vessel 105 further includes a lance 13 for injecting the heated oxygen-enriched air into the vessel 105. The lance 13 is centrally located and extends vertically downwardly into the vessel. The position of the lance 13 and the gas flow rate through the lance 13 are selected so that under steady-state process conditions the oxygen-containing gas penetrates the central region of the transition zone 23 and maintains an essentially metal/slag free space 25 around the end of the lance 13.

In use, under steady-state process conditions, the injection of the oxygen-containing gas via the lance 13 post-combusts reaction gases CO and $H_2$ in the transition zone 23 and in the free space 25 around the end of the lance 13 and generates high gas phase temperatures of the order of 2000° C. or higher in the gas space. The heat is transferred to the ascending and descending splashes droplets, and streams, of molten material in the region of gas injection and the heat is then partially transferred to the metal layer 15 when the metal/slag returns to the metal layer 15.

The free space 25 is important to achieving high-levels of post combustion because it enables entrainment of gases in the space above the transition zone 23 into the end region of the lance 13 and thereby increases exposure of available reaction gases to post combustion.

The combined effect of the position of the lance 13, gas flow rate through the lance 13, and upward movement of splashes, droplets and streams of molten metal and slag is to shape the transition zone 23 around the lower region of the lance 13—generally identified by the numerals 27. This shaped region provides a partial barrier to heat transfer by radiation to the side walls 5.

Moreover, under steady-state process conditions, the ascending and descending droplets, splashes and streams of metal and slag is an effective means of transferring heat from the transition zone 23 to the molten bath with the result that the temperature of the transition zone 23 in the region of the side walls 5 is of the order of 1450° C.–1550° C.

The vessel 105 is constructed with reference to the levels of the metal layer 15, the slag layer 16, and the transition zone 23 in the vessel 105 when the process is operating under steady-state process conditions and with reference to splashes, droplets and streams of molten metal and slag that are projected into the top space 31 above the transition zone 23 when the process is operating under steady-state operating conditions, so that:

(a) the hearth and the lower barrel section 53 of the side walls 5 that contact the metal/slag layers 15/16 are formed from bricks of refractory material (indicated by the cross-hatching in the figure);

(b) at least part of the lower barrel section 53 of the side walls 5 is backed by water cooled panels 8; and (c) the upper barrel section 51 of the side walls 5 and the roof 7 that contact the transition zone 23 and the top space 31 are formed from water cooled panels 58, 59.

Each water cooled panel 8, 58, 59 (not shown) in the upper barrel section 51 of the side walls 5 has parallel upper and lower edges and parallel side edges and is curved so as to define a section of the cylindrical barrel. Each panel includes an inner water cooling pipe and an outer water cooling pipe. The pipes are formed into a serpentine configuration with horizontal sections interconnected by curved sections. Each pipe further includes a water inlet and a water outlet. The pipes are displaced vertically so that the horizontal sections of the outer pipe are not immediately behind the horizontal sections of the inner pipe when viewed from an exposed face of the panel, ie the face that is exposed to the interior of the vessel. Each panel further includes a rammed refractory material which fills the spaces between the adjacent horizontal sections of each pipe and between the pipes. Each panel further includes a support plate which forms an outer surface of the panel.

The water inlets and the water outlets of the pipes are connected to a water supply circuit (not shown) which circulates water at high flow rate through the pipes.

Many modifications may be made to the preferred embodiment described above without departing from the spirit and scope of the present invention.

By way of example, whilst the preferred embodiment includes supplying at least part of the fuel gas to the coal carbonizer 7, the present invention is not so limited and includes other options, such as suppling the fuel gas to an oxygen plant as a source of energy for producing oxygen.

What is claimed is:

1. A process for direct smelting a metalliferous feed material which includes the steps of:

(a) pre-treating coal with an oxygen-containing gas and producing char and a fuel gas;

(b) heating air or oxygen-enriched air by supplying at least part of the fuel gas produced in step (a) to a hot air blast means and using the fuel gas as a source of energy for heating air or oxygen-enriched air in the hot air blast means;

(c) injecting the metalliferous feed material, char produced in step (a), and the heated air or heated oxygen-enriched air produced in step (b) into a direct smelting vessel; and (d) direct smelting the metalliferous feed material to molten metal in the direct smelting vessel using the char as a source of energy and as a reductant and post-combusting reaction gas produced in the smelting process with the heated air or heated oxygen-enriched air.

2. The process defined in claim 1 wherein the hot air blast means are hot blast stoves.

3. The process defined in claim 1 includes preheating the metalliferous feed material using at least part of the fuel gas produced in step (a) prior to injecting the feed material into the direct smelting vessel.

4. The process defined in claim 3 further includes pre-reducing the metalliferous feed material using at least part of the fuel gas produced in step (a) prior to injecting the feed material into the direct smelting vessel.

5. The process defined in claim 1 wherein direct smelting step (d) includes:

(a) forming a molten bath having a metal layer and a slag layer on the metal layer in the direct smelting vessel;

(b) injecting the metalliferous feed material and the char into the metal layer via a plurality of lances/tuyeres;

(c) smelting the metalliferous feed material to molten metal substantially in the metal layer;

(d) causing molten metal and slag to be projected as splashes, droplets, and streams into a space above a nominal quiescent surface of the molten bath and forming a transition zone; and (e) injecting the oxygen-containing gas into the direct smelting vessel via one or more than one lance/tuyere and post-combusting reaction gases released from the molten bath, whereby the ascending and thereafter descending splashes, droplets, and streams of molten metal and slag in the transition zone facilitate heat transfer to the molten bath, and whereby the transition zone minimises heat loss from the vessel via the side wall in contact with the transition zone.

6. The process defined in claim 1 further includes producing an oxygen-containing gas in an oxygen plant using at least part of the fuel gas produced in step (a) as a source of energy for the oxygen plant.

* * * * *